(12) United States Patent
Kurelek

(10) Patent No.: US 6,363,980 B1
(45) Date of Patent: Apr. 2, 2002

(54) ACCUMULATING TREE FELLING HEAD WITH PICKER ARM

(75) Inventor: John Kurelek, Brantford (CA)

(73) Assignee: Tigercat Industries Inc., Paris (CA)

( * ) Notice: Subject to any disclaimer, the term of this patent is extended or adjusted under 35 U.S.C. 154(b) by 0 days.

(21) Appl. No.: 09/585,479

(22) Filed: Jun. 2, 2000

Related U.S. Application Data

(60) Provisional application No. 60/140,677, filed on Jun. 24, 1999.

(51) Int. Cl.⁷ .................................................. A01G 23/08
(52) U.S. Cl. ..................................... 144/4.1; 144/34.1
(58) Field of Search ................................ 144/4.1, 24.13, 144/34.1, 34.5, 335, 336, 339

(56) References Cited

U.S. PATENT DOCUMENTS

| 3,805,860 A | | 4/1974 | Smith |
| 3,875,983 A | | 4/1975 | Kurelek |
| 3,910,326 A | | 10/1975 | Tucek |
| 4,153,087 A | * | 5/1979 | Stoychoff .................... 144/4.1 |
| 4,175,598 A | * | 11/1979 | Stoychoff .................... 144/4.1 |
| 4,793,389 A | * | 12/1988 | Sigouin et al. .............. 144/4.1 |
| 4,921,024 A | | 5/1990 | Wiemeri |
| 5,004,026 A | * | 4/1991 | MacLennan et al. ......... 144/4.1 |
| 5,109,900 A | | 5/1992 | Gilbert |
| 5,113,919 A | | 5/1992 | Maclennan |
| 5,697,412 A | | 12/1997 | Kurelek |
| 5,794,674 A | | 8/1998 | Kurelek |
| 5,931,210 A | | 8/1999 | Kurelek |
| 6,152,201 A | * | 11/2000 | Kurelek ...................... 144/4.1 |

FOREIGN PATENT DOCUMENTS

| CA | 1103130 | 6/1981 |

* cited by examiner

Primary Examiner—Ed Tolan
(74) Attorney, Agent, or Firm—R. Craig Armstrong

(57) ABSTRACT

A tree felling and accumulating head has tree storage pocket space with a preferably V-shaped backing shape to one side of the cutting area. A taker and a tucker arm, both pivoted on the opposite side, sweep trees into the storage space in cooperation with each other to build a well-aligned bundle. A second taker arm, operating from the pocket side, opposes the first taker arm to help gather and hold difficult trees but does not sweep in fully to disturb the trees already in the pocket space, even as the first taker closes fully.

11 Claims, 8 Drawing Sheets

ACCUMULATING TREE FELLING HEAD WITH PICKER ARM

REFERENCE TO RELATED APPLICATION

This application is related to and claims the benefit of U.S. provisional patent application No. 60/140,677, filed Jun. 24, 1999.

BACKGROUND OF THE INVENTION

This invention relates to tree severing apparatus, and more particularly to feller/buncher heads for successively cutting growing trees and accumulating a small bunch in the felling head before placing them in larger bunches on the ground. Feller bunchers in general are discussed in my U.S. Pat. No. 5,697,412. The present invention is an improvement on the feller buncher head described in that patent and the prior art cited therein.

My U.S. Pat. No. 3,875,983 describes the most predominant art of tree accumulation with a harvesting head in North America from the mid 70s to the mid 90s. It can be seen in FIGS. 6 to 11 of that patent that the geometry of the (taker) arms 70 and 75, which first grasp trees and of the (tucker) arms 90 and 91 which then accumulate them, are symmetrical about the centerline of the head. At that time we were only concerned with getting several trees behind the arms and thought that once we had them there they would somehow look after themselves in forming a bundle. There was no concern about how the trees nested amongst each other to form a bundle and the three trees in FIG. 11 of that patent are shown (impossibly) stacked in a center located row. In practice trees do not remain aligned that way and the later trees taken must fall into place amongst those taken first. Often trees crisscross with each other and the operator must abort the cycle without all the available space in the arms being filled with trees. Only a very experienced machine operator can fully load such a head. He does so by skillfully introducing successive trees from one side instead of the center, despite the symmetrical geometry. The usual number of 6 inch diameter trees that are taken with this design of head, hereinafter referred to as "older" Prior Art in this application, is three to five, but crisscross often prevents this.

Felling and accumulating heads by other inventors also did not fully attend to the details of getting tree stems to stay neatly aligned in their storage areas. Some like Smith in U.S. Pat. No. 3,805,860 and Tucek in U.S. Pat. No. 3,910,326, as examples, did push the taken trees against a curved backing shape with a single tucker arm, which was a start towards making a good bundle. But because these heads have two symmetrical taker arms, the bundle tends to be pushed away from the backing shape each time another tree is being admitted by the tucker—an action that often knocks the stems out of alignment. FIG. 4 in the Smith patent illustrates clearly how the lower taker arm 28 has pushed the tree bundle t away from the backing 30b, where it was in the earlier FIG. 3 sequence and where it has to return to after t' is embraced by the tucker 54.

Still others such as Gilbert in U.S. Pat. No. 5,109,900 and Maclennan in U.S. Pat. No. 5,113,919 use a single tucker arm and two symmetrical taker arms that push trees into a large radius backing shape that does even less guiding than the multi-sided U-shape in my older Prior Art. This wide backing shape and the lack of agreement between the takers and the tucker about where the first trees should be stored also results in poor bundle building.

Building a bunch in the center with these symmetrical taker arm heads has two disadvantages. Nesting alignment is poor, because due to torque imparted from bypassing arms being at different elevations, the stack usually falls to one side at its top backing and to the other side at the bottom backing, creating a crisscross mess. And, as a bunch is built up in the middle of the severance area, it prevents the taking of a final large tree. It is preferred to move cut trees at least slightly to one side for accumulation in a V area, where alignment is guided, and where the first trees do not immediately reduce the tree size that can still be cut.

Canadian patent no. 1,103,130 (Hamilton) and U.S. Pat. No. 4,921,024 (Wiemeri) are illustrative of some felling heads that were able to gain extra tree storage capacity by providing a space (a pocket) to one side and rearward of the tree cutting area. A taker arm operating from the side of the head opposite to the pocket swept trees from the severing area into the pocket. There they were accepted by a tucker that operated from the same side of the head as the pocket location. However due to practical geometry limitations, it was not possible for these inventors to make their tucking (accumulating) arms and their taking arms, coming from opposite sides of the pocket, cooperate in building a neat bundle.

Thus in my U.S. Pat. Nos. 5,697,412 and 5,931,210, where it is an objective to store an even larger number of trees, there is provided a more defined corner in a storage pocket and trees are placed there by an arm geometry which operates only from the side opposite the pocket. The taker and tucker arms previously operating from the other side have been omitted because it is not wanted, with each tree taken, to push the trees out of the corner where the pocket-opposing arms have placed them. The working scheme of such geometry is fully explained in those patents. It is the tucker that determines the shape of the bundle—after the taker has gone for another tree—and the taker (or takers) should agree with that shape when it returns. Some versions of these devices, hereinafter referred to as "recent" Prior Art, accumulate a practical maximum of fifteen 6-inch diameter trees and seldom experience crisscross.

In plantation harvesting logging conditions where trees are small and orderly this improved accumulation ability has led to full acceptance of this recent Prior Art over the older Prior Art. But in natural stands where some trees are very large in diameter and some have already fallen or leaned severely, the newer Prior Art is lacking in some abilities often needed—picking and gathering downed trees and holding large diameter trees briefly when felling. It can be seen in FIG. 3 that when it is necessary to pick up a tree stem that is already lying flat to the ground an older Prior Art head can be placed with one of its open taker arms tips on each side of the stem. As the arms are closed the tree stem can only move on the ground until opposed by the other tip and then it must be scooped up into the accumulation space. In FIG. 5 it is seen that if this is attempted with the newer Prior Art head the single arm tip will sometimes just nudge the stem along the ground and not get under it.

FIG. 4 shows older Prior Art embracing an oversized tree with balanced normal force directions at the arms. FIG. 6 shows the newer Prior Art attempting to hold the same tree stem and the evident lack of balanced forces. For most logging contractors it would be beneficial to use a versatile head that would cut and accumulate small trees at maximum efficiency and then also fell large trees singly when they occur.

SUMMARY OF THE INVENTION

Accordingly, it is an object of this invention to provide a tree felling and accumulating head that retains the better accumulation characteristics of the newer Prior Art while regaining the gathering and big-tree holding abilities of the older Prior Art.

It is now recognized from the success of my newer Prior Art that it is good for orderly tree accumulation to have a V backed pocket which is offset to one side of the head and which is loaded by a taker and a tucker operating from the opposite side of the head. Yet it is also recognized that the second taker, which has been discarded because it interfered with good bundle building, is now often missed because of the loss of its gathering and big tree holding actions.

This invention therefore introduces a form of second taker, with action geometry that operates in the tree-getting area but does not ever close down onto the bundle of stems being accumulated. The geometry of the cranks and the link that drive this second taker are designed and built with such proportions that after normal closing action in the gathering and big-tree-holding sweep area any further closing action of this second taker is retarded, and can even reverse slightly, as the first taker is fully stroked.

In the following description, for explanation ease I have mostly referred to this different-action new arm as a "second taker" because its location and external appearance are like those of a taker. In its practical use however, to avoid adding to the confusion that exists in nomenclature of felling head arms, and since it does not take the trees all the way into the accumulation area it is preferred to call it a "picker"—a better description of its work.

In the following illustrations and detailed descriptions it is shown that the sweep area of this picker is such that when the taker is in the tree gathering and big tree holding positions, the taker gets the same assistance from the picker as it would from a prior art opposing taker. It is also shown that unlike an ordinary taker the picker does not encroach into the tree storage area that is used by the first taker and the tucker for orderly bundle building.

BRIEF DESCRIPTION OF THE DRAWINGS

The invention will now be described in detail, with reference to the accompanying drawings of the preferred embodiment by way of example, listed as follows.

DETAILED DESCRIPTION

Figure 1:
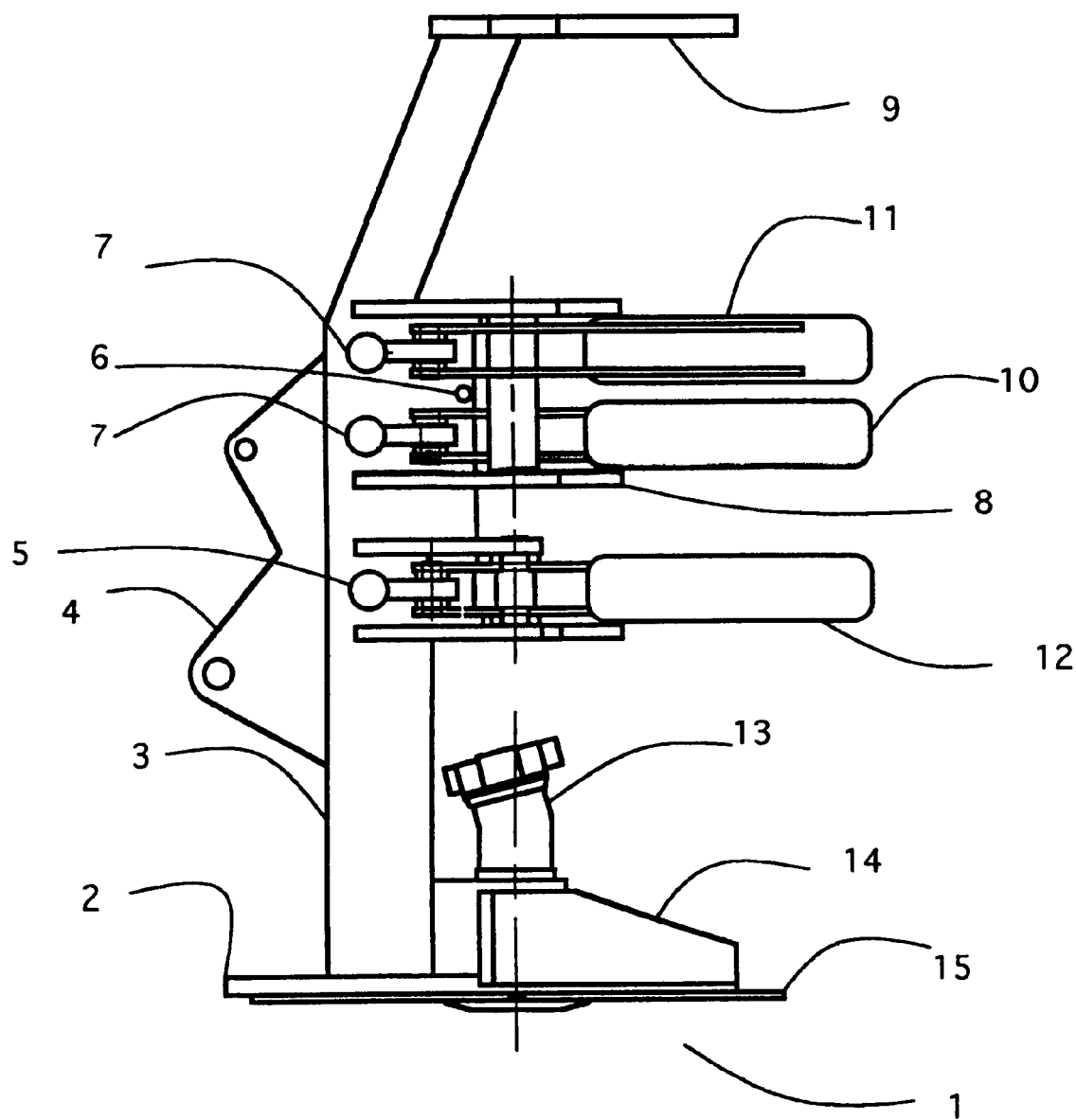
FIG. 1 (prior art) - A side elevation view of a typical prior art multiple tree felling head showing the relative locations of the active devices.

FIG. 1 (prior art) shows the typical elevation arrangement of the felling heads that this patent relates to. Main components include a head assembly 1, a saw housing 2, a structural frame 3, lugging 4 for pinning the head to a carrying boom and vehicle, a hydraulic cylinder 5 to stroke the tucker arm, a link 6 sometimes used to time the actions of one arm with another, cylinders 7 to stroke the taker arms, backing structures 8, 9 and 14 for trees (better seen in plan views), a first taker 10, a second taker 11 (where the picker is located in this invention), a tucker arm 12 (sometimes there are two here opposing each other), a motor 13 to drive the saw, and the saw 15.

Figure 2:
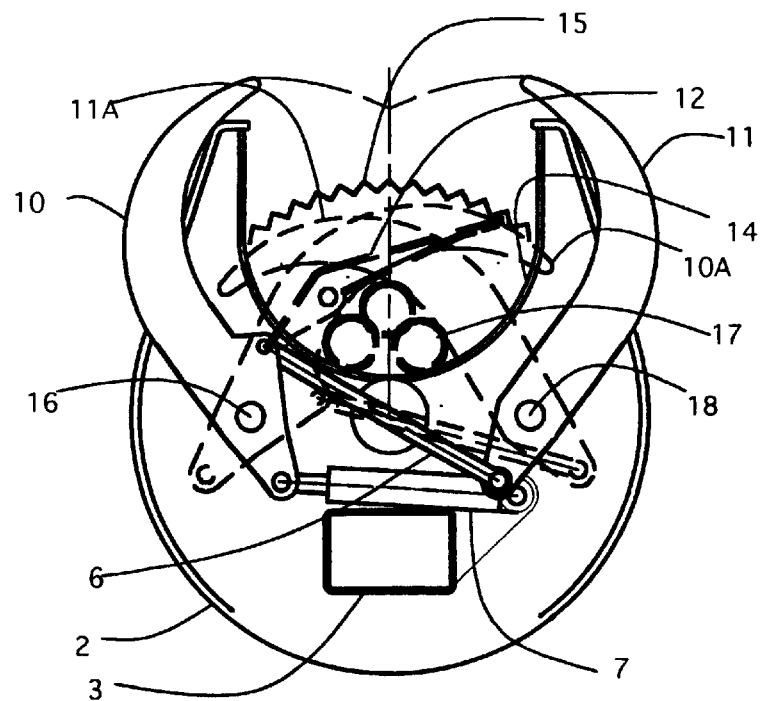
FIG. 2 (prior art) - A plan view of typical older prior art multiple tree accumulation geometry.

FIG. 2 (prior art) is a plan view of the tree taking and accumulation geometry and in addition to the items already identified in FIG. 1 it shows how the pivot points 16 and 18 of the arms are placed and how the bunch of small trees 17 is shaped by arms of the older prior art. The taker arms 10 and 11 close down to positions 10A and 11A to shape the bunch of trees. It should be noted that this symmetrical arm geometry and storage pocket builds its bunch in the center of the severance area, quickly limiting the capacity to cut further trees. It should also be noted that the 11A position of the second taker 11 opposes the efforts of tucker 12 to build the bunch more to the right.

Figure 3:
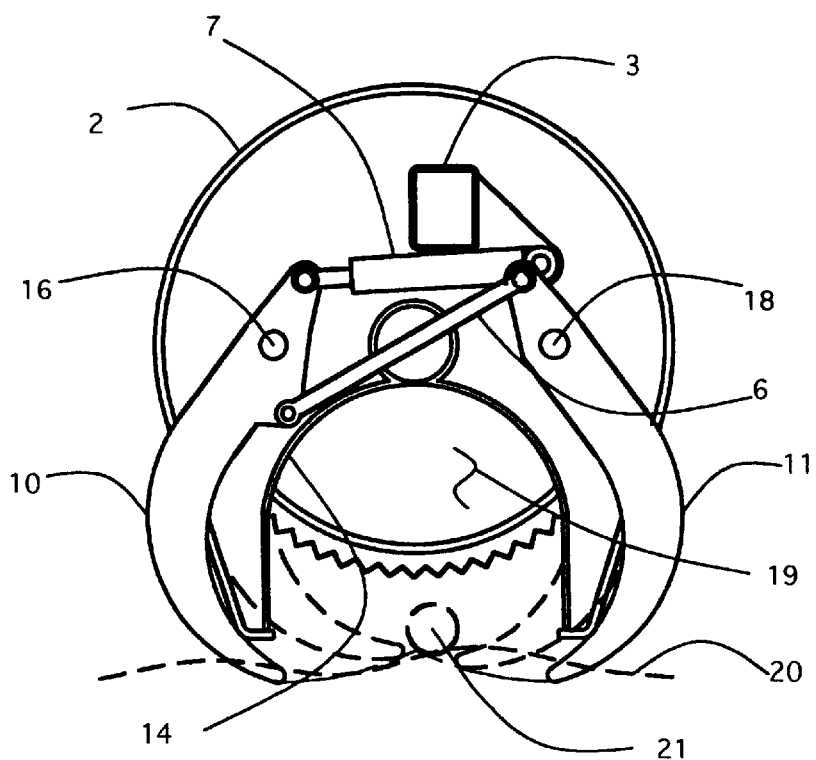
FIG. 3 (prior art) - An elevation view of older prior art arm geometry when tipped forward and gathering in a fallen tree.
Figure 5:
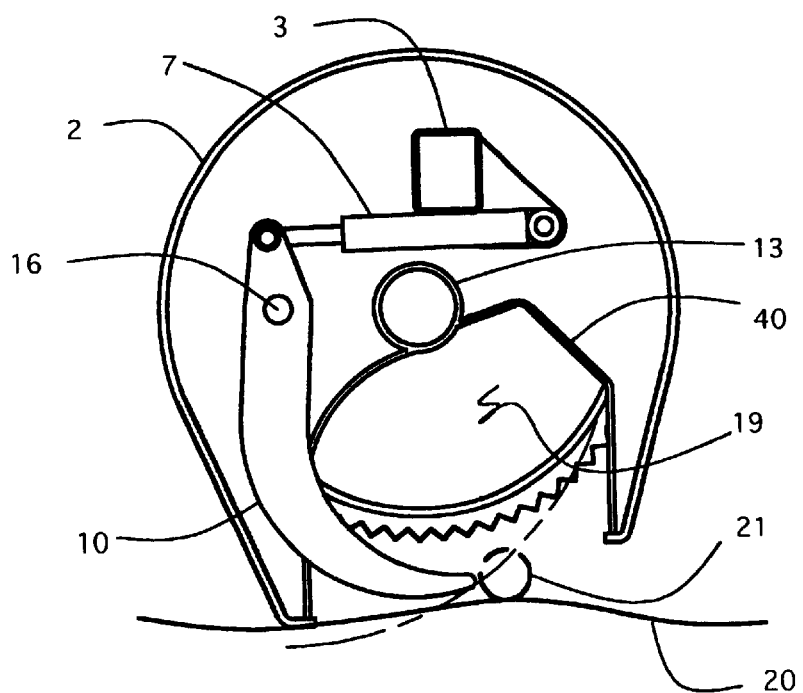
FIG. 5 (prior art) - A view of a more recent prior art head attempting to pick up a fallen tree stem.

FIG. 3 (prior art) is an elevation view of the older prior art head being tipped forward 90 degrees to successfully pick up a tree 21 that has fallen to the ground 20. This is in contrast to the recent prior art in FIG. 5 (prior art) where without the second taker it is shown to be more difficult to scoop up a tree from the ground. This lack of "gather" by the recent prior art is also noticed when trees are only leaning severely away from the feller buncher and not necessarily fully down. As can be seen by the shape of the butt plate 19 and the elimination of the second taker in FIG. 5, we can now store trees to one side of the cutting area and not have them disturbed—but we have lost "fallen tree pick-up".

Figure 4:
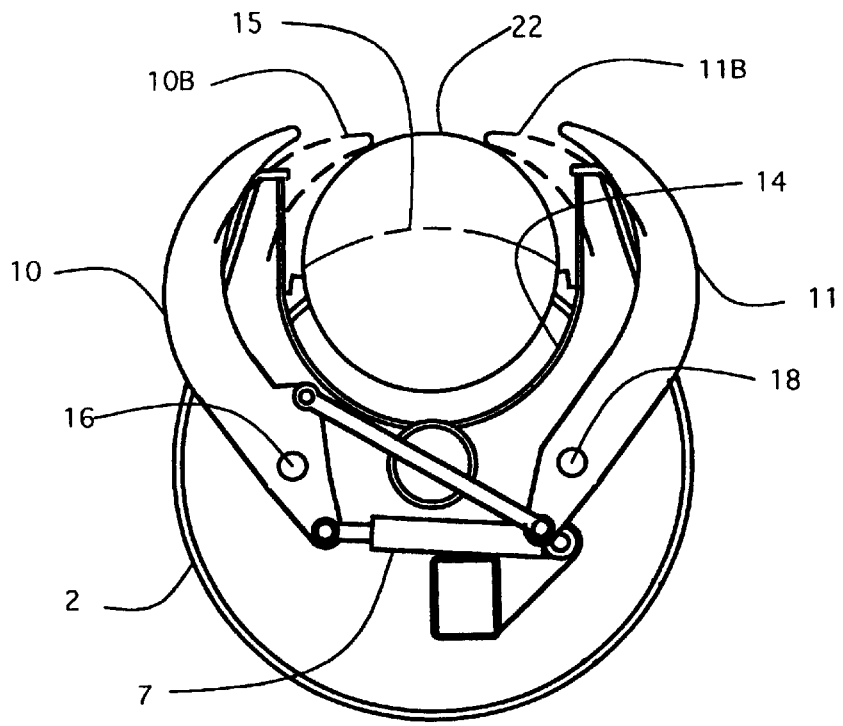
FIG. 4 (prior art) - A plan view of older prior art taker arms holding a much oversize tree.
Figure 6:
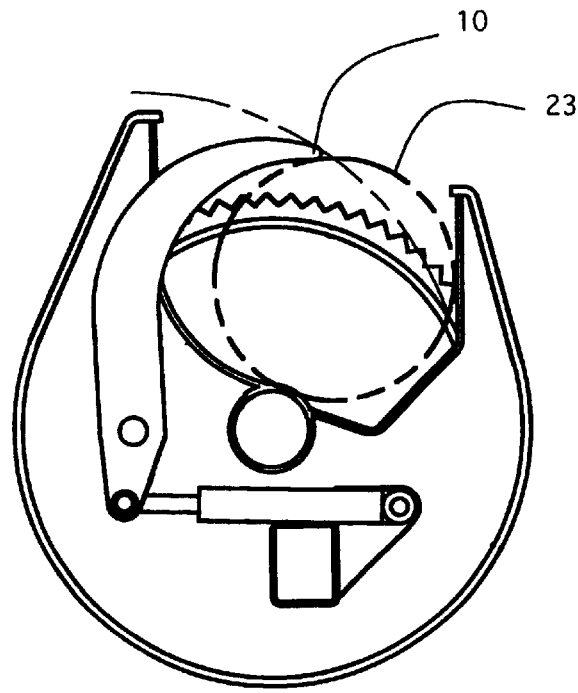
FIG. 6 (prior art) - A plan view of a more recent prior art head geometry holding an over size tree.

Similarly FIGS. 4 and 6 (both prior art) show that the more recent prior art also lacked the positive geometry to briefly hold and direct the felling direction of oversize trees 22 and 23.

Figure 7:
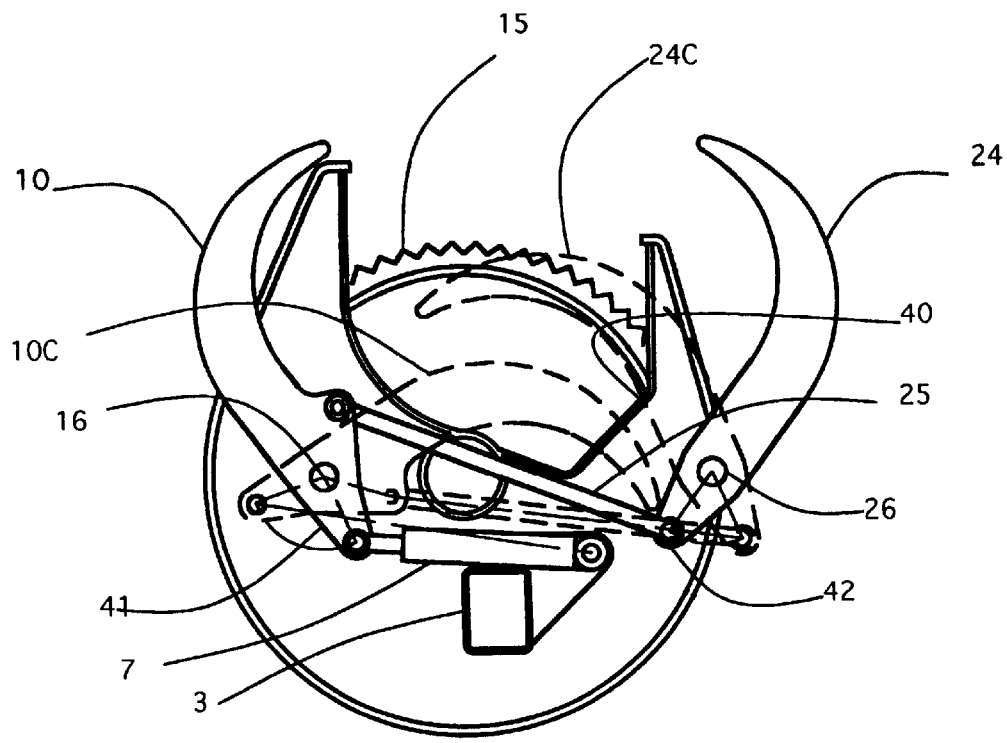
FIG. 7 - The picker arm geometry action of the invention, as obtained with a linkage mechanism.
Figure 8:
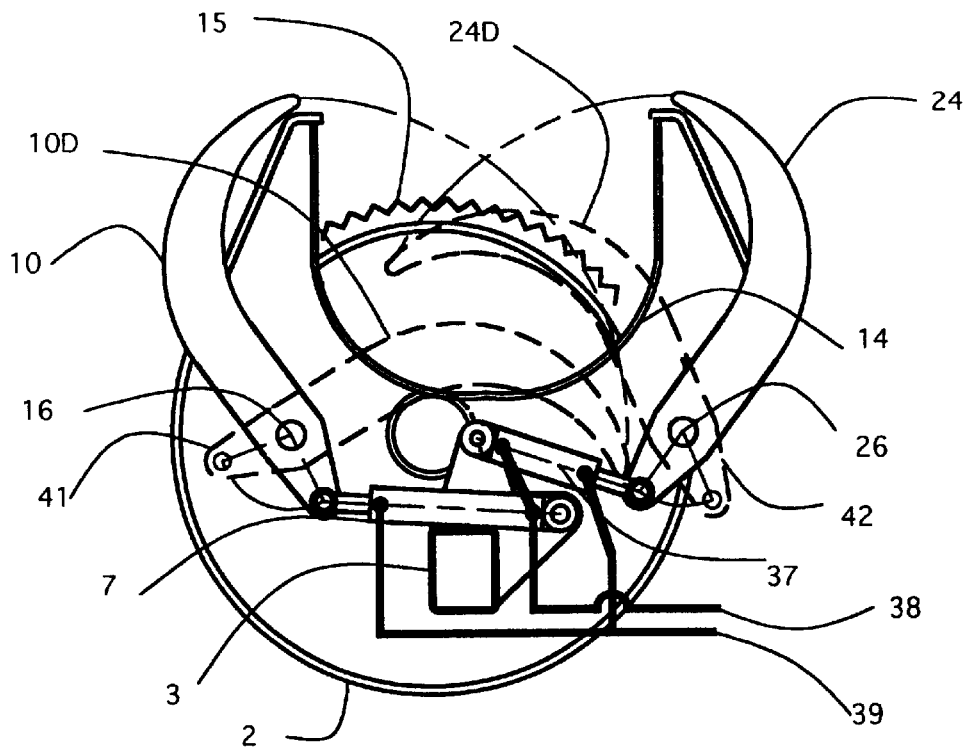
FIG. 8 - An alternative mechanism to get picker action by using a separate cylinder with a shorter stroke.

FIGS. 7 and 8 show how it is possible to revert to the second taker for good gather but give it the unusual geometry action of not closing down on the bundle of trees being assembled in the pocket. That is, just have it sweep normally about a pivot 26, in the area from fully open to approximately position 24C, as it is needed for picking and big tree directing. Then either stop or retard its travel as the first taker continues to the tree bunch or position 10C. The offset pocket area with a V backing 40 is retained in FIG. 7. In FIG. 8 backing 14 with a large radius is shown to illustrate that there would still be some benefit from allowing the bundle to be pushed to the right by the taker and tucker.

In FIG. 7 those skilled in the art of logging machine arm geometry layout can adjust the lengths and angles of the tail cranks 41 and 42 on taker 10 and picker 24 and the length of link 25 so that picker 24 sweeps to picker 24C while taker 10 goes to taker 10C. In this illustration the crank on taker 10 toggles and ceases to advance the link as it closes all the way down and thus leaves the picker still out. Other cylinder, crank and linkage schemes that similarly retard the picker travel could be used.

Figure 9:
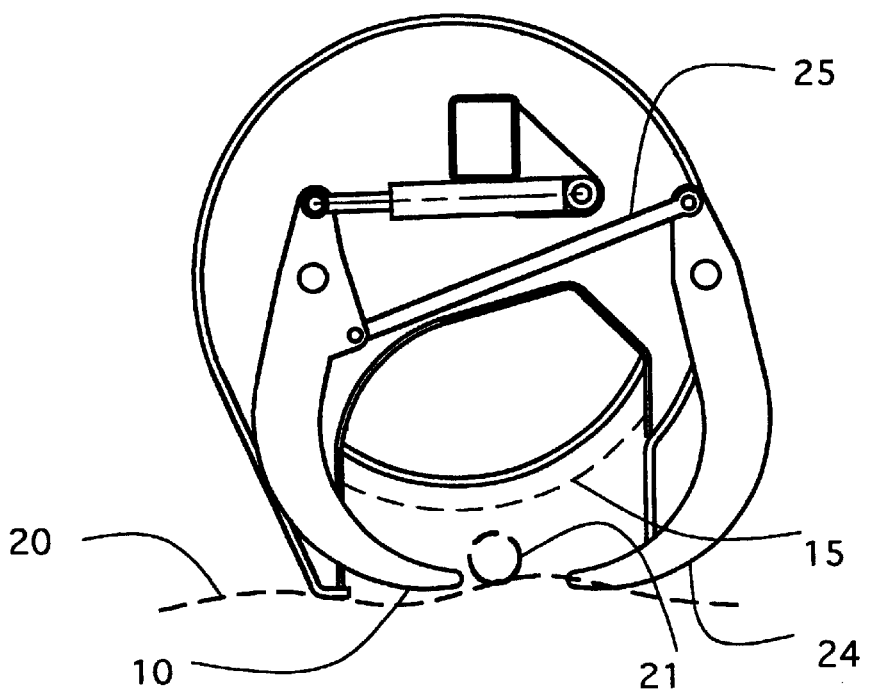
FIG. 9 - The invention geometry picking a fallen tree with assistance from the picker arm.

Many prior art heads do not use a link to connect and time the actions of their two takers but rather use a separate cylinder at each arm assembly with their closing and opening hydraulic lines 38 and 39 teed together. As in FIG. 8, installing an appropriate shorter stroke cylinder 37 for arm 24 can reduce its sweep to the 24C position. This would be of some help on existing heads but for fall accumulation benefit it is also required to change the backing shapes 14 to the V type 40. For some logging operations with much picking as shown in FIG. 9 the link method is preferred over the separate cylinders, because of the complexity of flow controls needed to avoid one of the taker arms closing much ahead of the other and missing the tree.

Figure 10:
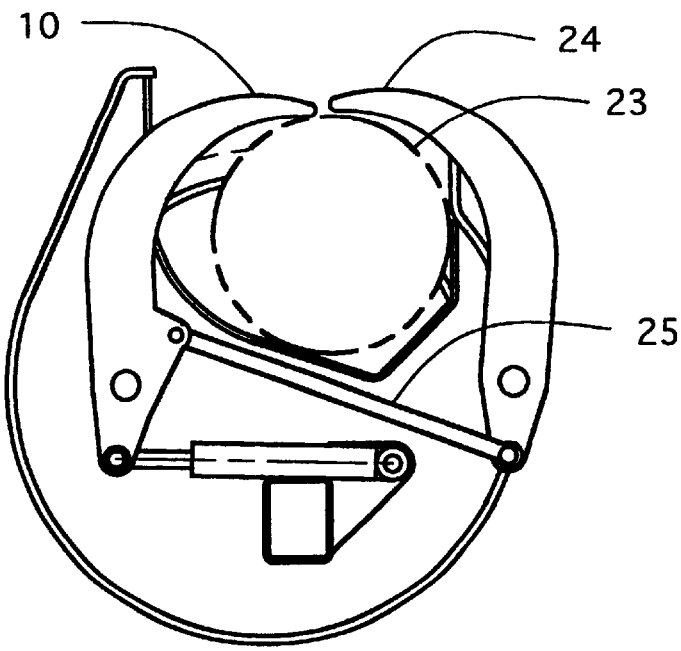
FIG. 10 - The invention geometry holding an over size tree with assistance from the picker.
Figure 11:
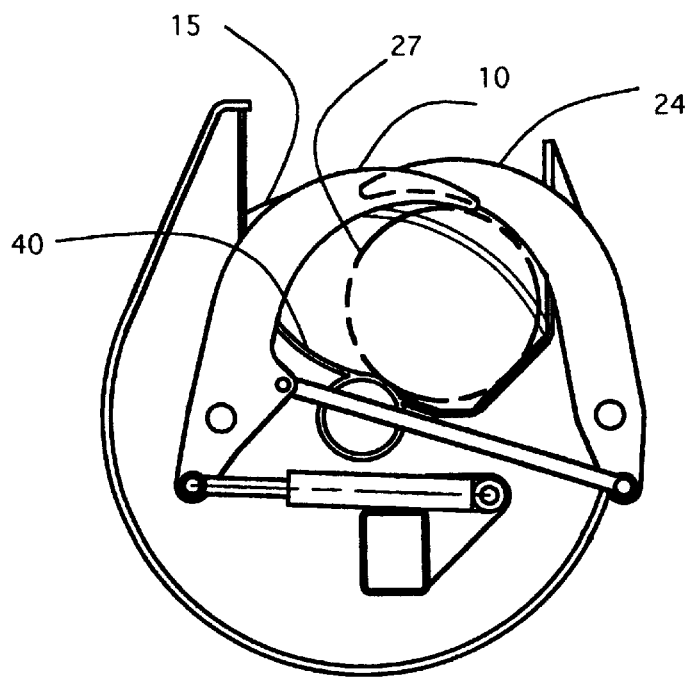
FIG. 11 - The invention geometry holding a full cut size tree with assistance from the picker.
Figure 12:
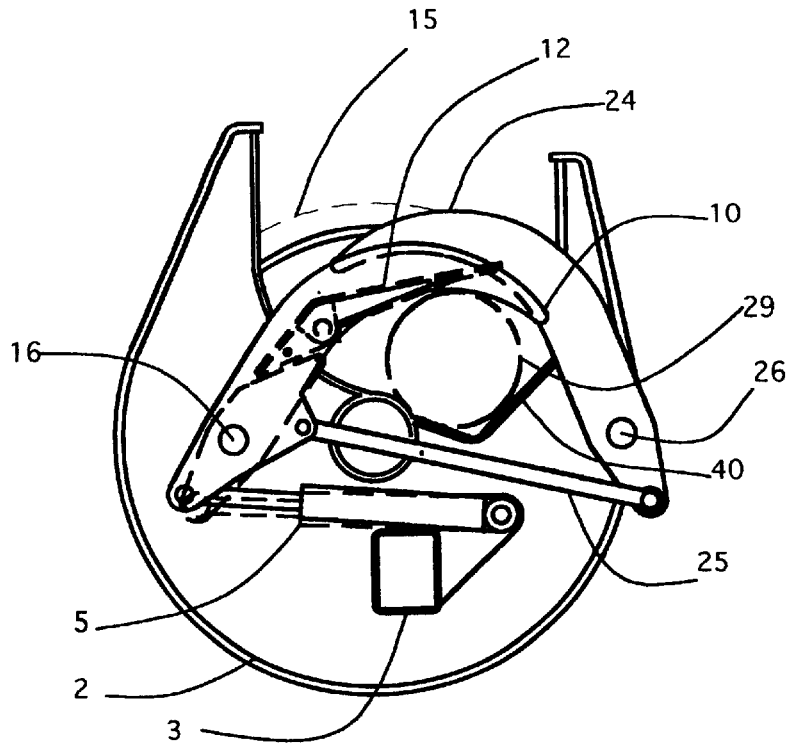
FIG. 12 - The invention geometry taker holding a medium size tree in cooperation with the tucker while the picker stays clear.
Figure 13:
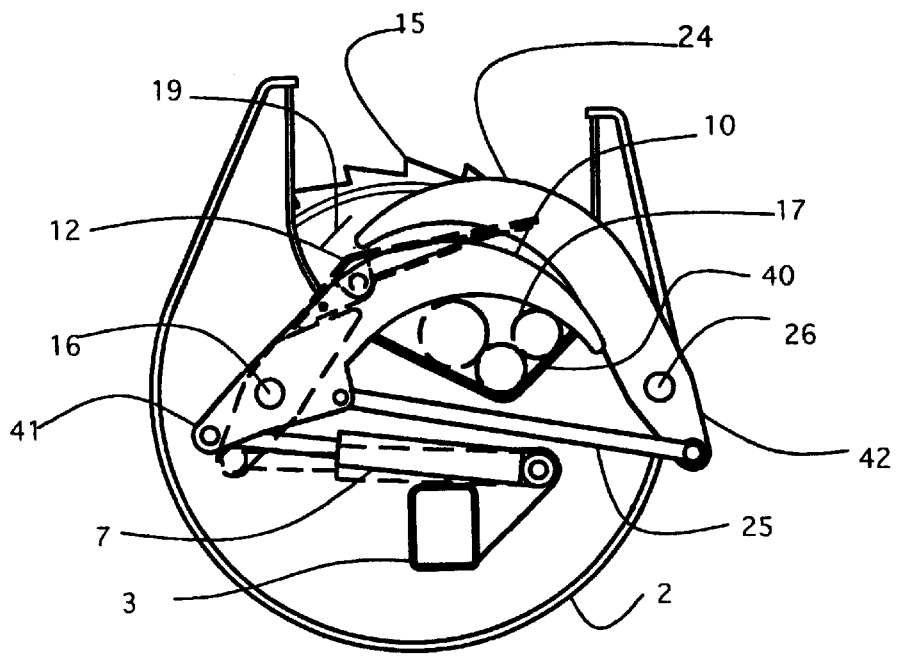
FIG. 13 - The invention geometry plan view showing three trees held by the taker while the picker stays well clear.
Figure 14:
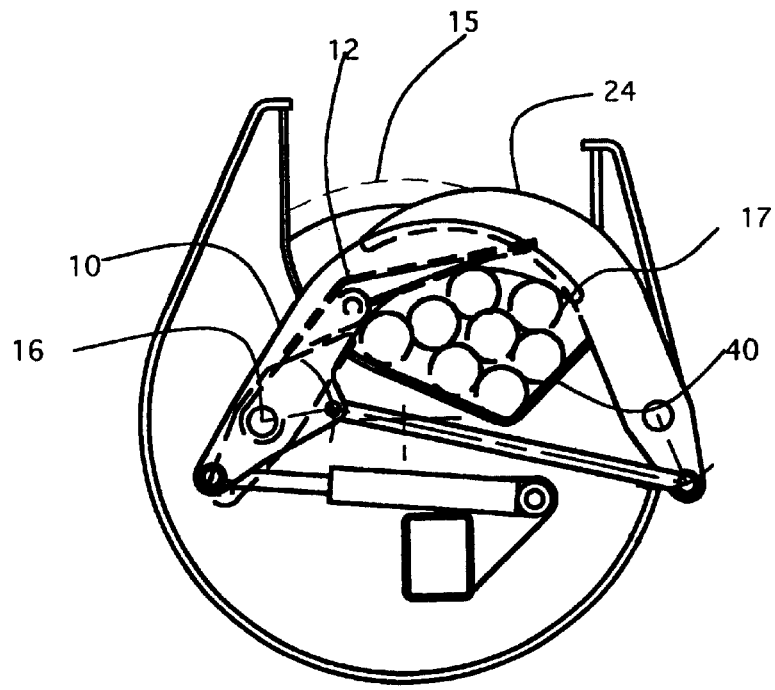
FIG. 14 - The invention geometry with the tucker and taker holding a maximum bunch while the picker stays just clear.

FIG. 10 shows the taker and the picker cooperating in embracing an oversize tree 23. FIG. 11 shows that the picker is still in effect when a full cut size tree 27 is harvested. However in FIG. 13 it is seen that when the tucker 12 is open (to admit another tree) the location of small trees 17 in the pocket is determined by only the taker 10 and not the picker 24. FIG. 14 shows that as the bundle is built up to the capacity limit of the tucker the picker 24 only begins to approach the bundle—hopefully only correcting strays. As seen in FIG. 12, with a medium size single tree 29, the picker 24 does not contact the tree after it reaches its destination in the V.

Figure 15:
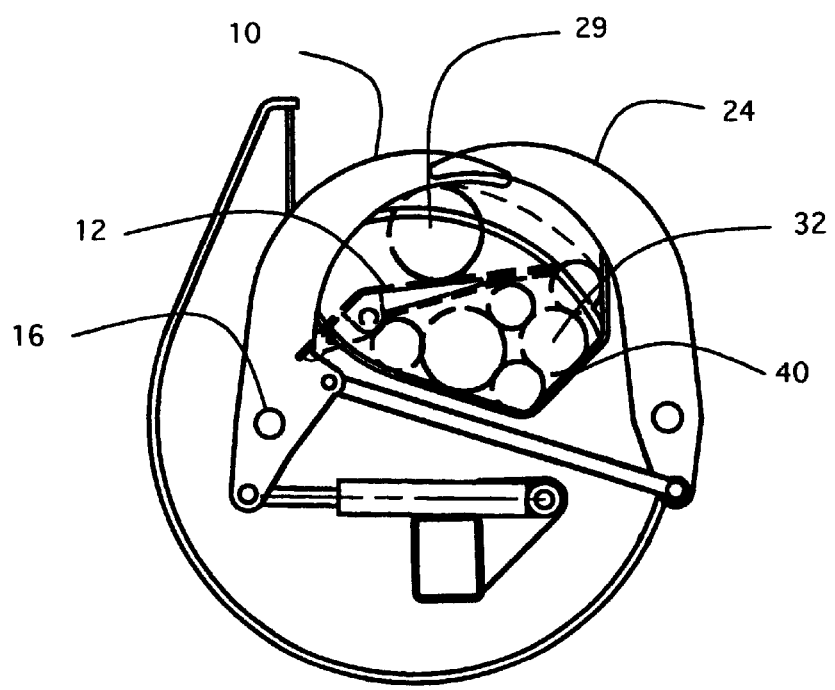
FIG. 15 - The invention geometry showing how sometimes the picker allows an extra tree to be taken.

A benefit, namely being able to store many trees to one side of the saw centerline, is illustrated in FIG. 15. Even though the tucker arm has reached its limit with the bundle of mixed trees 32, another 10-inch tree 31 can still be cut and held.

What is claimed is:

1. A tree cutting and accumulating head comprising:
   a frame;
   a tree severing means at a bottom of the frame;
   a tree accumulation space offset to one side of an imaginary center line of the severing means;
   a tucker arm operating from a side of the head opposite the accumulation space;
   a first taker arm operating from a side of the head opposite the accumulation space; and
   a second taker arm operating opposite the first taker arm; wherein the first taker arm is activated through its sweep action by a hydraulic cylinder and a linkage, the second taker arm is activated with reference to the first taker arm by a second linkage between the first taker arm and the second taker arm, and the second linkage is configured such that the second taker arm mirrors approximately the action of the first taker arm for a substantial portion of the first taker's closing sweep action, but does not encroach on the area occupied by trees in the accumulation space even as the first taker arm proceeds to fully close into the tree accumulation space.

2. A tree cutting and accumulating head as in claim 1, wherein said tree severing means comprises a tree severing saw.

3. A tree cutting and accumulating head as in claim 1, wherein said tree accumulation space opposing the arms is generally V-shaped.

4. A tree cutting and accumulating head as in claim 3, wherein said V-shape has a corner radius of less than 3 inches.

5. A tree cutting and accumulating head as in claim 2, wherein said tree accumulation space opposing the arms is generally V-shaped.

6. A tree cutting and accumulating head as in claim 5, wherein said V-shape has a corner radius of less than 3 inches.

7. A tree cutting and accumulating head as in claim 3, wherein said V-shape an included angle of not more than 120 degrees.

8. A tree cutting and accumulating head as in claim 4, wherein said V-shape an included angle of not more than 120 degrees.

9. A tree cutting and accumulating head as in claim 5, wherein said V-shape an included angle of not more than 120m degrees.

10. A tree cutting and accumulating head as in claim 6, wherein said V-shape an included angle of not more than 120 degrees.

11. A tree cutting and accumulating head comprising:
    a frame;
    a tree severing saw and saw housing at the bottom;
    a tree accumulation space offset to one side of the saw centerline;
    a tucker arm operating from the side of the head opposite the accumulation space;
    a first taker arm operating from the side of the head opposite the accumulation space; and
    a second taker arm operating opposite the first taker arm; wherein the second taker arm mirrors approximately the action of the first taker arm about the saw centerline axis for a substantial portion of the first taker's closing sweep action but stops short of encroaching on space occupied by accumulated trees even as the first taker closes fully into the accumulation space.

* * * * *

UNITED STATES PATENT AND TRADEMARK OFFICE
CERTIFICATE OF CORRECTION

PATENT NO. : 6,363,980 B1
DATED : April 2, 2002
INVENTOR(S) : Kurelek

It is certified that error appears in the above-identified patent and that said Letters Patent is hereby corrected as shown below:

Title page,
Item [*] Notice, delete the phrase "by 0 days" and insert -- by 155 days --

Signed and Sealed this

Twenty-eighth Day of September, 2004

JON W. DUDAS
*Director of the United States Patent and Trademark Office*